United States Patent
Hawk

(10) Patent No.: US 10,605,403 B2
(45) Date of Patent: Mar. 31, 2020

(54) CANTILEVERED SCREWLESS HANGER

(71) Applicant: Christopher Hawk, Bridgeton, NJ (US)

(72) Inventor: Christopher Hawk, Bridgeton, NJ (US)

( * ) Notice: Subject to any disclaimer, the term of this patent is extended or adjusted under 35 U.S.C. 154(b) by 0 days.

(21) Appl. No.: 16/150,487

(22) Filed: Oct. 3, 2018

(65) Prior Publication Data

US 2019/0113175 A1 Apr. 18, 2019

Related U.S. Application Data

(60) Provisional application No. 62/571,318, filed on Oct. 12, 2017.

(51) Int. Cl.
*F16M 13/02* (2006.01)
*A47G 7/04* (2006.01)
*G09F 17/00* (2006.01)

(52) U.S. Cl.
CPC ........... *F16M 13/022* (2013.01); *A47G 7/044* (2013.01); *A47G 7/045* (2013.01); *G09F 17/00* (2013.01)

(58) Field of Classification Search
CPC combination set(s) only.
See application file for complete search history.

(56) References Cited

U.S. PATENT DOCUMENTS

| | | | |
|---|---|---|---|
| 3,064,933 A | 11/1962 | Joseph | |
| 3,504,108 A | 3/1970 | Kihs | |
| 4,534,129 A * | 8/1985 | Stuckey | A01G 9/128 47/47 |
| 4,908,982 A * | 3/1990 | Quatrini | A47G 7/042 248/297.51 |
| 5,476,240 A * | 12/1995 | McDonough | A46B 17/02 211/65 |
| D405,682 S * | 2/1999 | Suher | D8/370 |
| 6,209,837 B1 * | 4/2001 | Harms | A47B 57/567 248/210 |
| D458,115 S * | 6/2002 | Harms | D8/363 |
| 6,971,204 B1 * | 12/2005 | Gibney | A47G 7/044 47/39 |
| 7,275,728 B1 * | 10/2007 | Branson | A47G 7/045 248/302 |
| 8,430,366 B2 * | 4/2013 | Tincher | A01K 97/10 248/214 |
| 8,561,345 B2 | 10/2013 | Armas | |
| 2007/0252061 A1 | 11/2007 | Feetham et al. | |
| 2014/0283449 A1 | 9/2014 | Rapone | |

* cited by examiner

*Primary Examiner* — Monica E Millner
(74) *Attorney, Agent, or Firm* — Boudwin Intellectual Property; Daniel Boudwin

(57) ABSTRACT

A cantilevered screwless hanger. The cantilevered screwless hanger includes an elongated member having a support assembly disposed on a first end thereof. In some embodiments, the elongated member includes a hanging device on a second end thereof. The support assembly includes a lower U-shaped member, a connecting member extending upwardly therefrom, and an upper U-shaped member connected to the connecting member. The lower U-shaped member is oriented opposite the upper U-shaped member, such that a first opening defined by the lower U-shaped member is oriented opposite a second opening defined by the upper U-shaped member. The support assembly is adapted to removably secure the cantilevered screwless hanger to an elongated structure comprising a square cross-section without the use of additional fasteners, such that the support structure is not damaged during installation of the cantilevered screwless hanger.

10 Claims, 6 Drawing Sheets

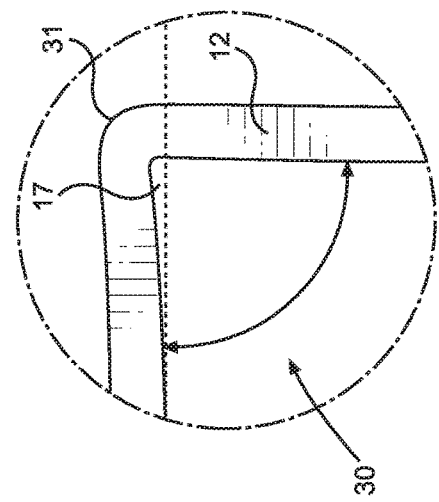
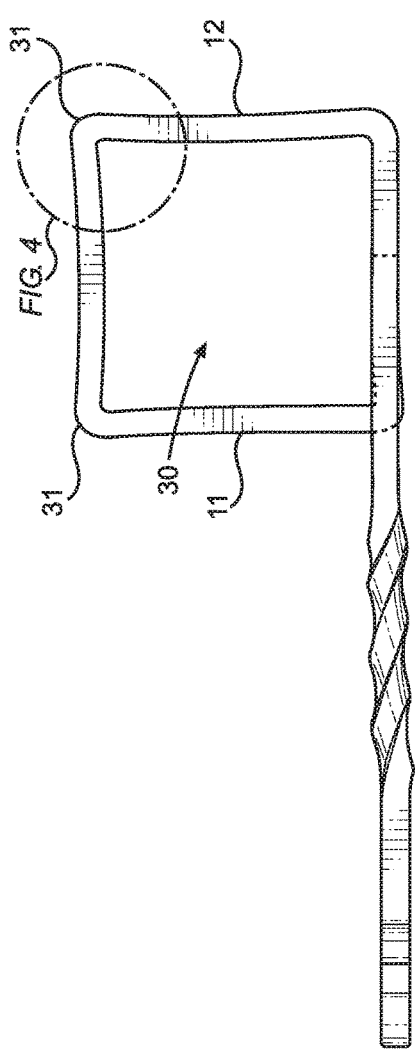
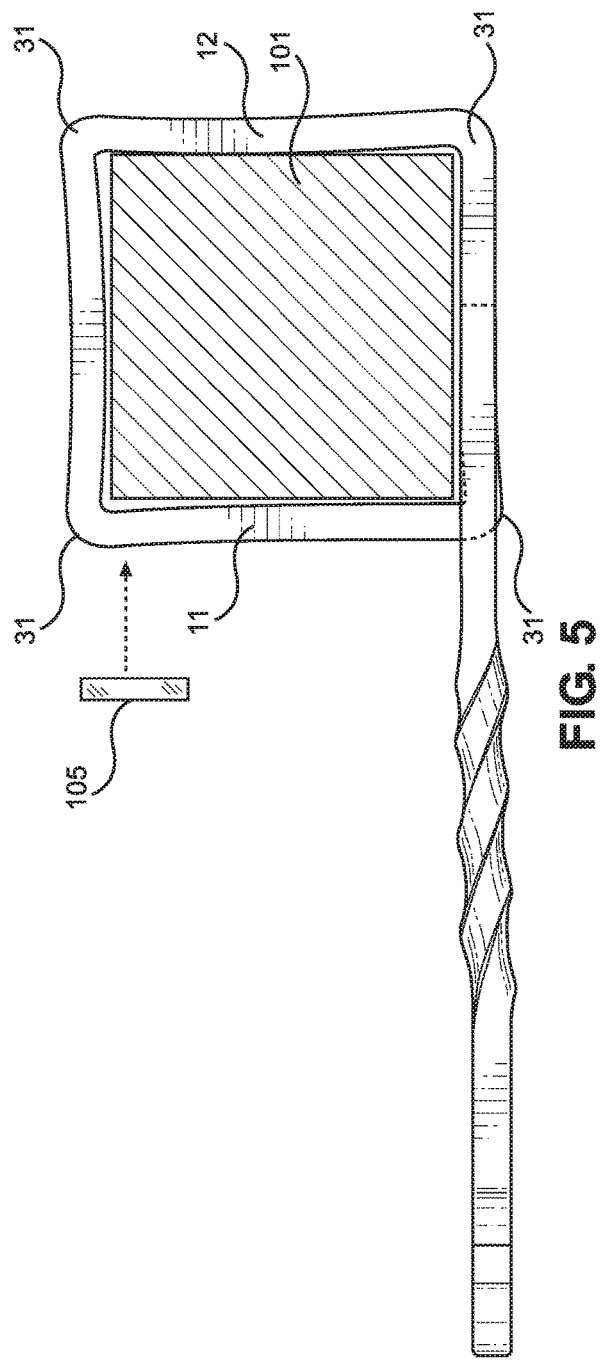

CANTILEVERED SCREWLESS HANGER

CROSS REFERENCE TO RELATED APPLICATIONS

This application claims the benefit of U.S. Provisional Application No. 62/571,318 filed on Oct. 12, 2017. The above identified patent application is herein incorporated by reference in its entirety to provide continuity of disclosure.

BACKGROUND OF THE INVENTION

The present invention relates to cantilevered support devices. More specifically, the present invention provides a cantilevered screwless hanger that can be utilized to support objects from a vertically oriented square post without the use of fasteners.

Many individuals utilize support devices such as hooks to hang objects outdoors, such as a flag, a potted plant, or the like. Support hooks are often secured to a structure via fasteners such as nails or screws. The use of such fasteners requires tools that the individual may not have available at their disposal, such as a drill. The use of fasteners to hang a support hook can also cause damage to the structure to which the support hook is secured. Further, it is difficult and time-consuming to unfasten the fasteners if an individual wishes to remove or reposition the support hook. For example, rental properties sometimes disallow installation of fixtures that cause damage to the supporting structure, so renters are often unable to utilize such permanently-fastened support devices. It is therefore desirable to provide a cantilevered screwless hanger that is adapted to be removably secured to a vertical structure having a square cross section, such as a square post, in order to hang ornamental or functional items therefrom.

Devices have been disclosed in the known art that relate to cantilevered support devices. These include devices that have been patented and published in patent application publications. The devices generally relate to attaching a support device to an object via a cantilever force. However, the devices in the known art have several drawbacks. These devices are typically designed to attach to round poles, and such devices would damage the corners of a square post if secured thereto. Additionally, these devices fail to provide cantilevered support hangers that can be easily rotated about a square vertical support structure and then locked into place for installation in a desired orientation, such that further rotation is prevented when the hanger is installed. Further, the known art cantilevered support devices fail to provide a support device specifically configured to be securable to a square post that includes inaccessible upper and lower ends, such as a baluster of a railing or fence, for example.

In light of the devices disclosed in the known art, it is submitted that the present invention substantially diverges in design elements from the known art and consequently it is clear that there is a need in the art for an improvement to existing cantilevered support devices. In this regard, the present invention substantially fulfills these needs.

SUMMARY OF THE INVENTION

In view of the foregoing disadvantages inherent in the known types of cantilevered support devices now present in the prior art, the present invention provides a cantilevered screwless hanger wherein the same can be utilized for providing convenience for the user when supporting an object from a vertically oriented square post without the use of additional fasteners. The cantilevered screwless hanger includes an elongated member comprising a support assembly disposed on a first end thereof. The support assembly comprises a lower U-shaped member, a connecting member extending upwardly therefrom, and an upper U-shaped member connected to the connecting member. The lower U-shaped member is oriented opposite the upper U-shaped member, such that a first opening defined by the lower U-shaped member is oriented opposite a second opening defined by the upper U-shaped member. The support assembly is adapted to removably secure the cantilevered screwless hanger to a structure comprising a square cross-section via a moment applied by the force of gravity acting on the elongated member. In this way, the support assembly is adapted to removably secure the cantilevered screwless hanger to an elongated structure comprising a square cross-section without the use of additional fasteners.

An object of the present invention is to provide a cantilevered screwless hanger that is configured to utilize leverage and the weight of an object to be hung in order to support the object from a vertical structure without using fasteners that could potentially damage the structure.

A further object of the present invention is to provide a cantilevered screwless hanger configured to form a gap that is sized to receive a locking shim configured to frictionally secure the support assembly to the support structure in the event that the cantilever force is reduced below a threshold amount.

Another object of the present invention is to provide a cantilevered screwless hanger that is dimensioned such that it can be positioned about a vertical structure that has inaccessible upper and lower ends, such as a post that extends from a floor to a ceiling, or a post that has an ornamental top portion larger than its main diameter, for example.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 3 shows a top plan view of an embodiment of the cantilevered screwless hanger.

FIG. 4 shows a detail view of the offset corner component of an embodiment of the cantilevered screwless hanger.

FIG. 5 shows a top plan view of an embodiment of the cantilevered screwless hanger secured to a square post.

DETAILED DESCRIPTION OF THE INVENTION

Figure 1:
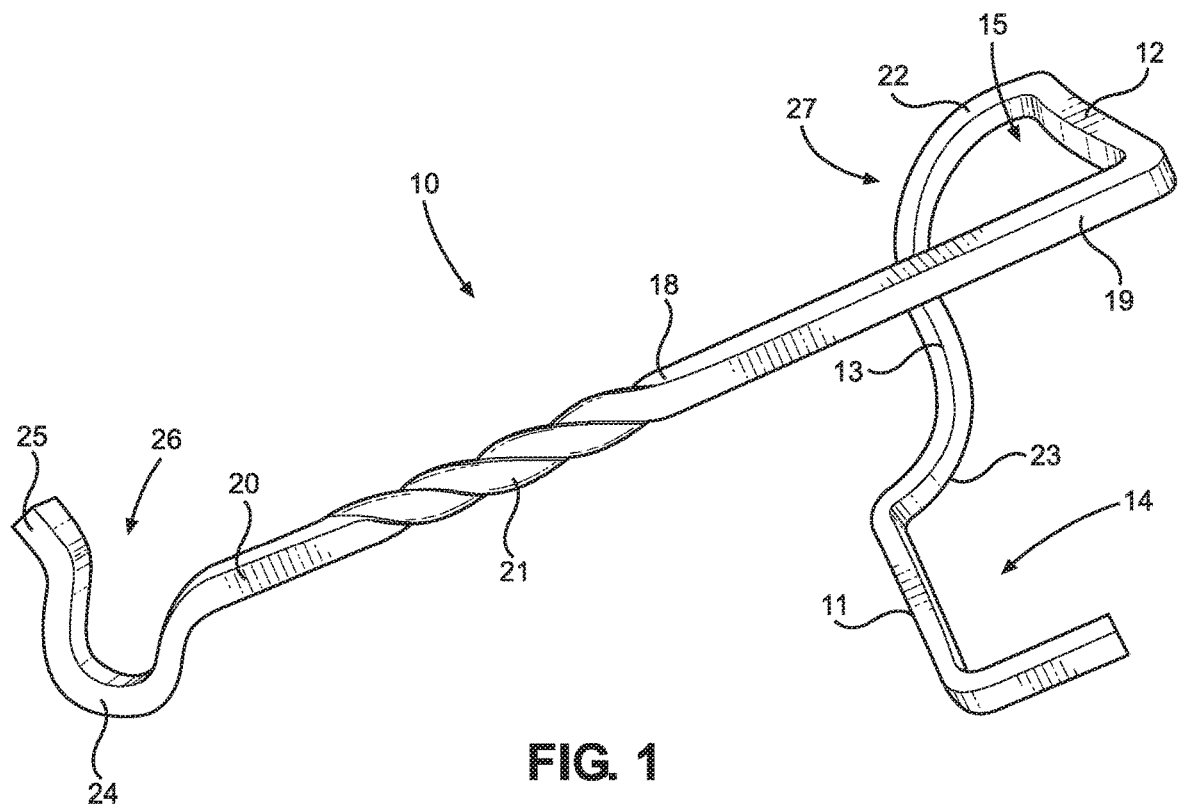
FIG. 1 shows a perspective view of an embodiment of the cantilevered screwless hanger.

Reference is made herein to the attached drawings. Like reference numerals are used throughout the drawings to depict like or similar elements of the cantilevered support hanger. For the purposes of presenting a brief and clear description of the present invention, the preferred embodiment will be discussed as used for securing to a vertically oriented square post without the use of fasteners in order to hang objects therefrom. The figures are intended for representative purposes only and should not be considered to be limiting in any respect.

Figure 2:
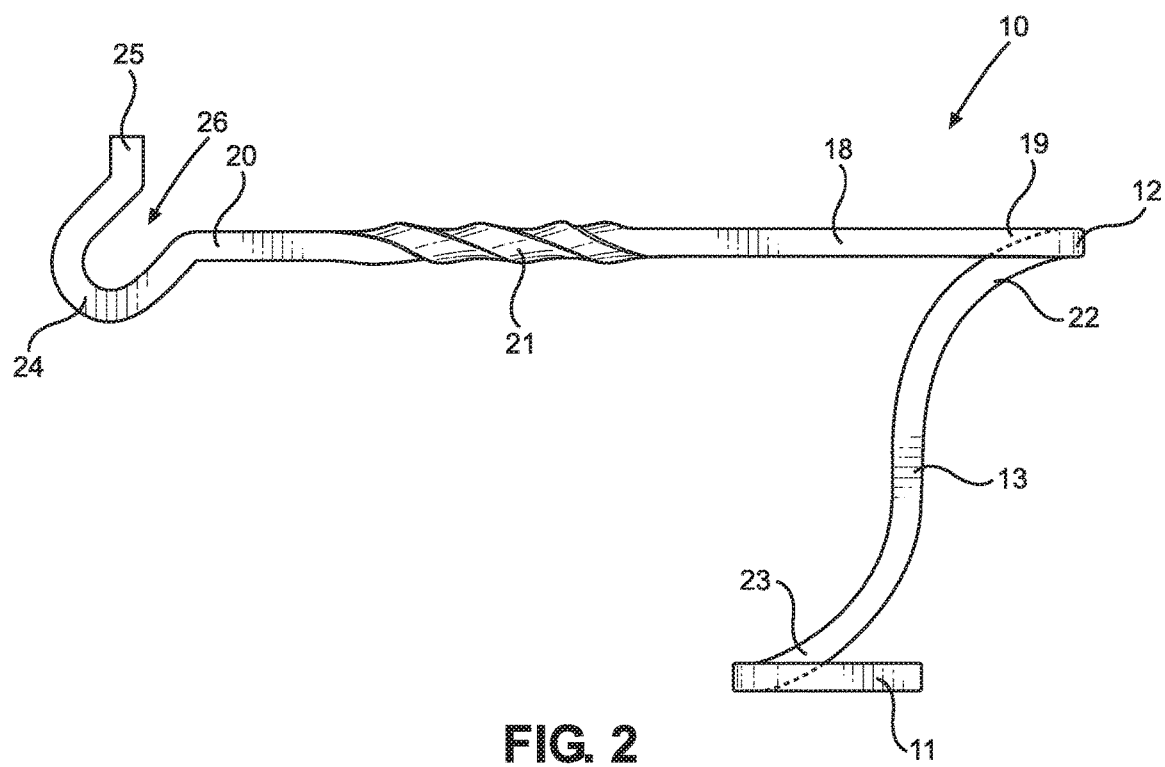
FIG. 2 shows a side elevation view of an embodiment of the cantilevered screwless hanger.

Referring now to FIGS. 1 and 2, there is shown a perspective view of an embodiment of the cantilevered screwless hanger and a side elevation view of an embodiment of the cantilevered screwless hanger, respectively. The cantilevered screwless hanger 10 includes an elongated member 18 comprising a support assembly 27 disposed on a first end 19 thereof. In the shown embodiment, the elongated member 18 further includes a hanging device 24 disposed on an opposing second end 20 thereof. The support assembly 27 includes a lower U-shaped member 11 connected to an upper U-shaped member 12 via a connecting member 13. In the shown embodiment, an upper end 22 of the connecting member 13 is continuous with the upper U-shaped member 12, and a lower end 23 of the connecting member 13 is continuous with the lower U-shaped member 11. The lower U-shaped member 11 is oriented opposite the upper U-shaped member 12, such that a first opening 14 defined by the lower U-shaped member 11 is oriented opposite a second opening 15 defined by the upper U-shaped member 12.

In the shown embodiment, the connecting member 13 comprises an S-shape for stability. However, the connecting member 13 can include additional shapes, such as a linear shape, for example. Additionally, in the shown embodiment, the elongated member 18 includes a linear shape having a central twist portion 21 that consists of a single 'twist' in the elongated member 18 about its lengthwise axis, which is adapted to increase structural stability of the screwless cantilevered hanger 10. Alternate embodiments may include additional lengthwise twists, or may include a straight horizontal elongated member 18 having no twists. In yet another alternate embodiment, the elongated member 18 can have an alternate shape, i.e. a downward curve. Additional embodiments can include an elongated member 18 that has no hanging device on the end thereof, such that an object can be supported directly on the elongated member 18.

In the shown embodiment, the upper U-shaped member 12 is continuous with the first end 19 of the elongated member 18. Further, in the shown embodiment, the elongated member 18, the hanging device 24, the upper U-shaped member 12, the lower U-shaped member 11, and the connecting member 13 comprise a unitary construction, which lessens construction costs and increases durability. Additionally, in the shown embodiment, the elongated member 18, the hanging device 24, the upper U-shaped member 12, the lower U-shaped member 11, and the connecting member 13 comprise a square cross section, which provides structural rigidity and further allows the U-shaped members 11, 12 to make continuous contact with a planar face of a square support structure when hanging the cantilevered screwless hanger 10 therefrom. The interior sides of the U-shaped members 11, 12 contact the supporting structure and evenly spread the force applied thereto, ensuring the cantilevered screwless hanger 10 is effectively secured to the supporting structure. In alternate embodiments, the cantilevered screwless hanger 10 can include another cross-sectional shape, such as circular, for example.

In the shown embodiment, the hanging device 24 comprises a hook having a curved body defining an upper opening 26. The hook includes a projection 25 extending from a distal end thereof and is configured to support objects within the upper opening 26. For example, the hook can support a sign, a flag, a hanging potted plant, or any other decorative or functional object that may be hung from a hook. The projection 25 is adapted to prevent hanging objects from accidentally leaving the hook due to environmental hazards such as high winds. In alternate embodiments, the hanging device 24 can comprise any suitable fastener, such as a clip, clamp, hook and loop fastener, or the like. Further, in some embodiments, the elongated member 18 comprises no additional hanging device thereon.

Referring now to FIGS. 3 and 4, there is shown a top plan view of an embodiment of the cantilevered screwless hanger and a detail view of the offset corner component of an embodiment of the cantilevered screwless hanger, respectively. The cantilevered screwless hanger 10 is configured to be secured to a vertically oriented pole or post 101 that includes a square cross section. In one embodiment, U-shaped members 11, 12 include offset interior corners 31, which creates a small opening 17 that prevents the device from damaging the corners of the post or pole when the cantilevered screwless hanger is being positioned in a desired orientation about the post or pole. The connecting member also forms a gap between the post and the cantilevered screwless hanger 10 that can receive a locking shim 105 therein, which is shown in FIG. 5. The shim 105 frictionally secures the hanger 10 to the post 101 in the event that wind or other forces causes the cantilever force applied by the elongated member to be reduced below an amount of force that keeps the hanger 10 secured to the post 101.

Referring now to FIG. 5, there is shown a top plan view of an embodiment of the cantilevered screwless hanger secured to a post. While the offset corners 31 extend slightly outwardly from the post 101, the inner portions of the U-shaped members 11, 12 contact opposing faces of the post 101. Since the corners 31 provide additional movement space, the cantilevered screwless hanger can be easily positioned in a desired orientation about the post 101. The cantilevered screwless hanger can further be positioned at a desired elevation along the vertical length of the post 101 by lifting the elongated member upwardly and tilting it rearwardly toward the post, such that the U-shaped members 11, 12 disengage the post, and moving the hanger to its desired vertical position.

Figure 6:
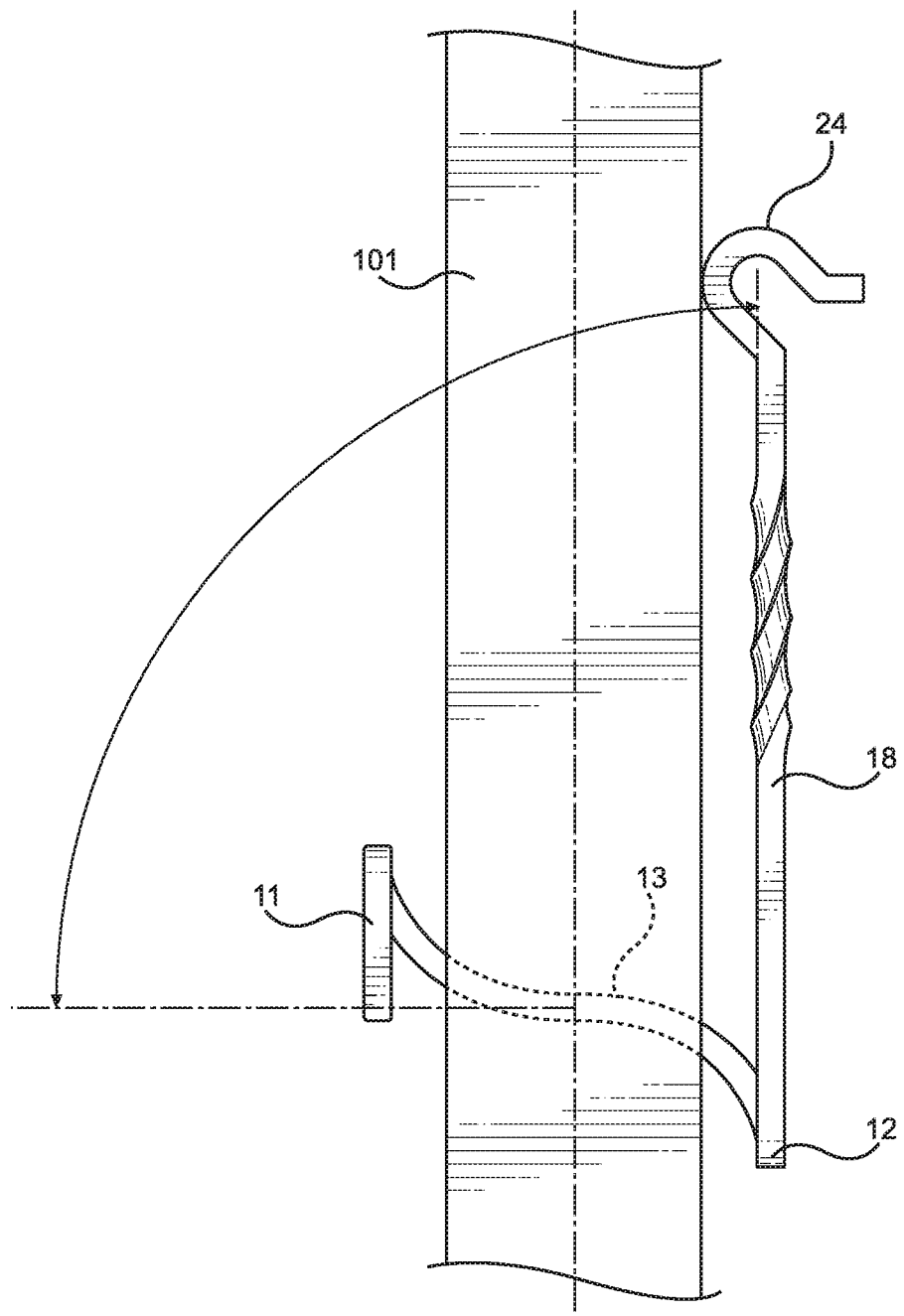
FIG. 6 shows a side elevation view of an embodiment of the cantilevered screwless hanger being positioned about a square post.
Figure 7:
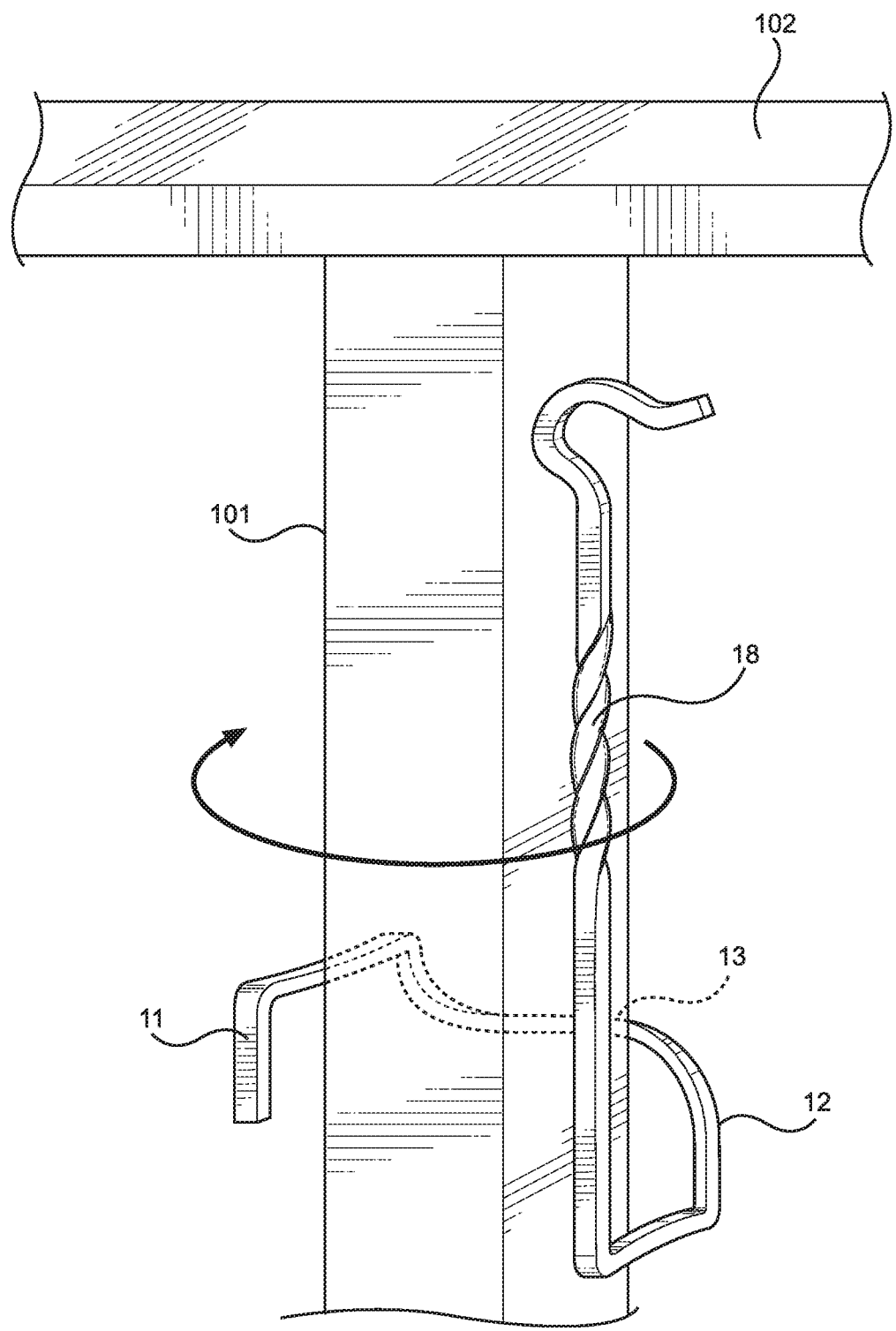
FIG. 7 shows a perspective view of an embodiment of the cantilevered screwless hanger being positioned about a square post.

Referring now to FIGS. 6 and 7, there is shown a side elevation view of an embodiment of the cantilevered screwless hanger being positioned about a post and a perspective view of an embodiment of the cantilevered screwless hanger being positioned about a square post, respectively. The dimensional ratio, defined as the length of the connecting member 13, or the distance between the upper and lower U-shaped members 11, is such that the cantilevered screwless hanger can be oriented about a square post having an inaccessible upper end. Particularly, the distance between the upper and lower U-shaped members 11, 12 is equal to or greater than a diagonal length of a square support structure. The diagonal length is defined as the hypotenuse of a triangle formed by adjacent sides of the square cross section of a square post. Additionally, the width of each U-shaped member 11, 12 must be greater than the width of the support structure. For example, this allows the cantilevered screwless hanger to be easily and removably secured to a square support structure such as a post 101 that extends between a floor and a ceiling, or a square post that includes a large ornamental feature disposed on its upper end. Other examples include a square baluster of a fence or railing that includes a horizontal top rail 102, as shown in FIG. 7. In operation, the dimensional ratio allows the cantilevered screwless hanger to be placed around and be rotated about a square post to a desired mounting position. The device can be made in any size as long as the dimensional ratios between the U-shaped members 11, 12 and the connecting member 13 are preserved.

To install the cantilevered screwless hanger, the user can rotate the device upward, rotate the device about the post 101 as illustrated in FIG. 7, and rotate the device downward when the desired orientation is achieved, such that elongated member extends outwardly from the post 101 in a desired orientation. Multiple orientations and vertical elevations about the post's 101 vertical axis can be selected and locked in against unwanted rotation due to winds or other forces by virtue of the interior sides of the upper and lower U-shaped members 11, 12 contacting the opposing front and rear faces of the post 101.

Figure 8:
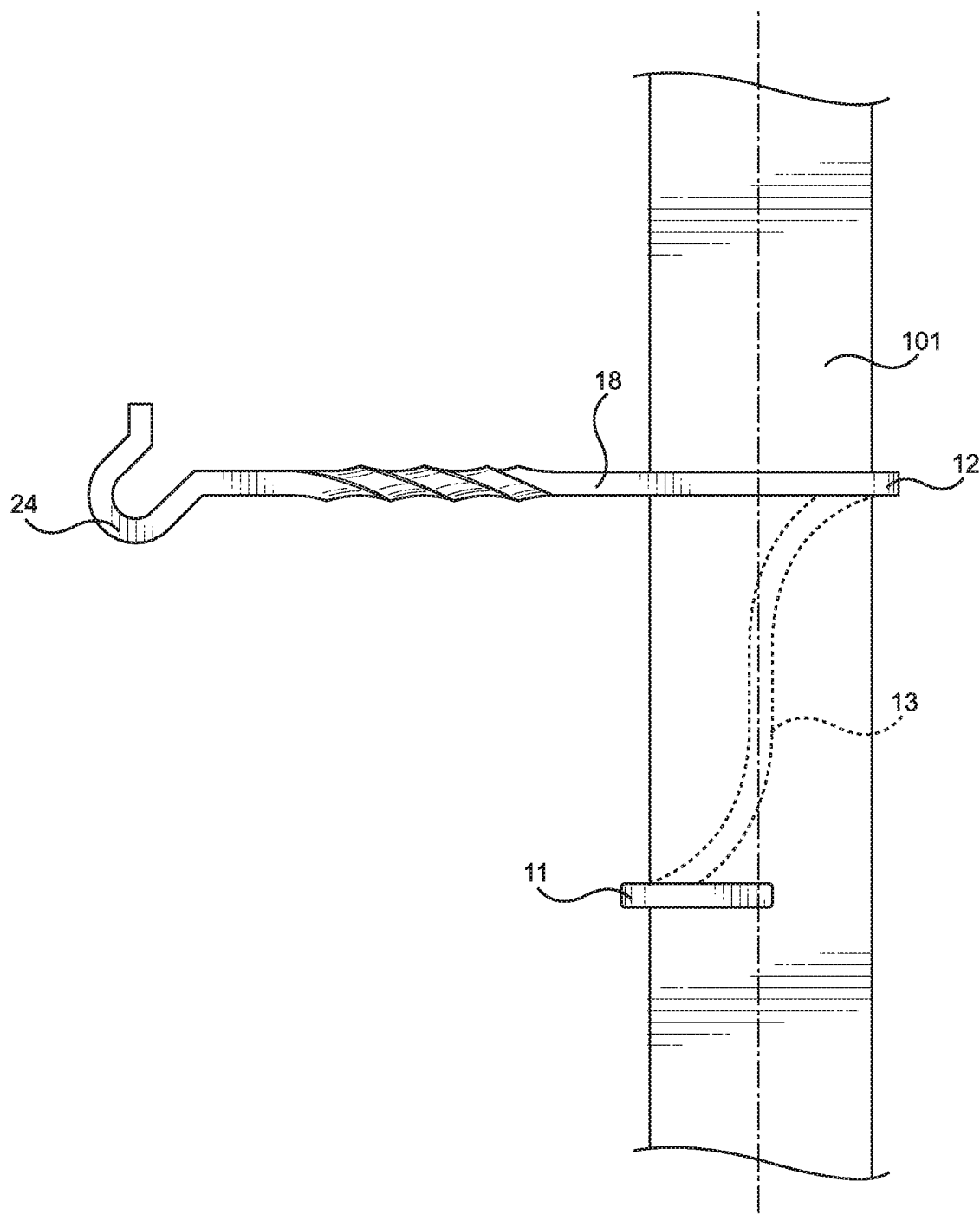
FIG. 8 shows a side elevation view of an embodiment of the cantilevered screwless hanger secured to a square post.
Figure 9:
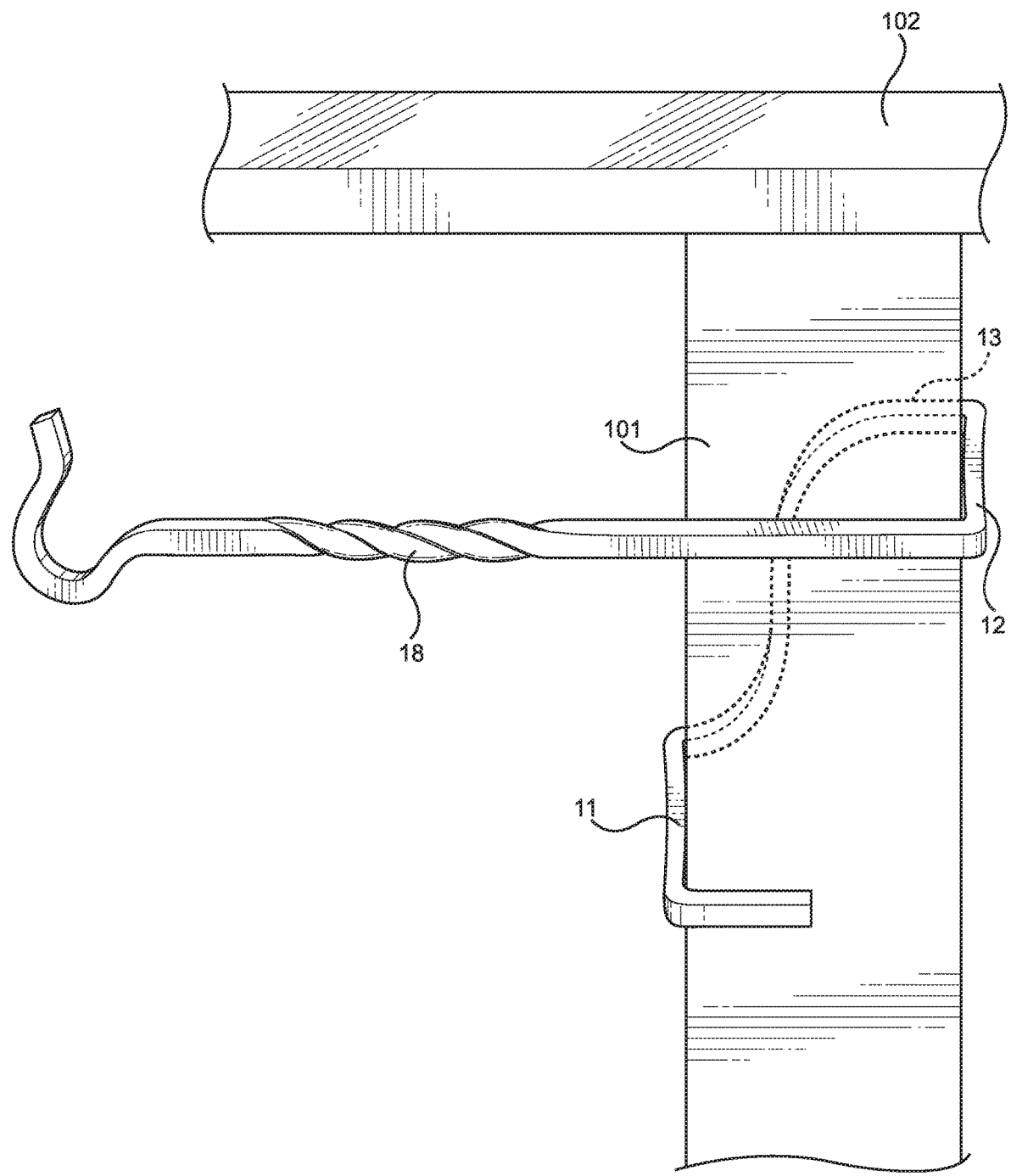
FIG. 9 shows a perspective elevation view of an embodiment of the cantilevered screwless hanger secured to a square post.

Referring now to FIGS. 8 and 9, there is shown a side elevation view of an embodiment of the cantilevered screwless hanger secured to a post and a perspective view of an embodiment of the cantilevered screwless hanger secured to a post, respectively. The upper-U shaped member 12 is oriented opposite the lower U-shaped member 11, such that the open inner portion of the upper U-shaped member 12 contacts a rear face of a square pole or post 101, while the open inner portion of the lower U-shaped member 11 contacts a front face of the pole or post 101. In the shown embodiment, the elongated member 18 is oriented to be generally perpendicular to the pole or post 101 to which the cantilevered screwless hanger is attached.

When an object is placed on the hanging device 24, or hung along the elongated member 18 in embodiments that do not include the hanging device, the weight of the object causes a vertical force to be applied to the elongated member 18. The vertical forces causes a moment which in turn causes the upper U-shaped member 12 to be secured against the rear face of the pole or post 101, and further causes the lower U-shaped member 11 to be secured against the front face of the pole or post 101, whereby the connecting member 13 is dimensioned so as to evenly distribute the forces against the front and rear faces of the post 101. In this way, the upper and lower U-shaped members 12, 11 effectively create a clamp on the post when 101 an object is hung from the hanging device 24, thereby preventing slippage of the cantilevered screwless hanger and supporting the object in place. The cantilevered screwless hanger can thus be secured to the square pole or post 101 without the use of fasteners by using the weight of the hanging object to keep the cantilevered screwless hanger secured to the pole or post 101 in a specific vertical position, as well as a fixed rotational position about the post's 101 vertical axis. Further, a locking shim can be utilized within the gap formed by connecting member to frictionally secure the hanger to the square post in order to further prevent movement of the device if the cantilever force drops below the required amount to keep the hanger secured to the post.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cantilevered screwless hanger configured to removably secure to a support structure having a square cross section, comprising:
    an elongated member comprising a support assembly disposed on a first end thereof;
    the support assembly comprising a lower U-shaped member, a connecting member extending upwardly therefrom, and an upper U-shaped member connected to the connecting member;
    wherein the lower U-shaped member is oriented opposite the upper U-shaped member, such that a first opening defined by the lower U-shaped member is oriented opposite a second opening defined by the upper U-shaped member;
    wherein the support assembly is configured to removably secure the cantilevered screwless hanger to the support structure via a moment applied by the force of gravity acting on the elongated member, such that the support assembly is removably secured to the support structure without the use of an additional fastener, such that the elongated member extends outwardly and perpendicularly from the support structure;
    wherein the upper and lower U-shaped members comprise a width that is greater than a width of the support structure to which the support assembly is secured;
    wherein a distance between the upper and lower U-shaped members is equal to or greater than a diagonal length of the support structure, such that and the connecting member is configured to allow the upper and lower U-shaped members to rotate about the support structure when the cantilevered screwless hanger is in a vertical orientation.

2. The cantilevered screwless hanger of claim 1, wherein the elongated member, the upper and lower U-shaped members, and the connecting member comprise a unitary construction.

3. The cantilevered screwless hanger of claim 1, wherein the lower U-shaped member is configured to engage a rear side of the support structure and the upper U-shaped member is configured to engage an opposing front side of the support structure when the support assembly is removably secured thereto.

4. The cantilevered screwless hanger of claim 1, wherein the connecting member comprises an S-shape.

5. The cantilevered screwless hanger of claim 1, wherein the upper and lower U-shaped members comprise a plurality of offset interior corners configured to define an opening between each offset interior corner of the plurality of offset interior corners and the support structure.

6. The cantilevered screwless hanger of claim 1, wherein the connecting member defines a gap when the support assembly is secured to the support structure, wherein the gap is sized to receive a locking shim configured to frictionally secure the support assembly to the support structure.

7. The cantilevered screwless hanger of claim 1, wherein a second end of the elongated member comprises a hanging device thereon.

8. The cantilevered screwless hanger of claim 7, wherein the hanging device comprises a hook.

9. The cantilevered screwless hanger of claim 8, wherein the hook comprises an upper opening and a projection extending from a distal end of the hook, wherein the projection is configured to prevent objects from falling from the hook.

10. The cantilevered screwless hanger of claim 1, wherein the elongated member is configured to extend outwardly from a vertical support structure to which the support assembly is secured.

\* \* \* \* \*